United States Patent [19]

Reh et al.

[11] 4,000,441
[45] Dec. 28, 1976

[54] HORIZONTAL DEFLECTION CIRCUIT FOR TELEVISION RECEIVERS HAVING AN AUXILIARY POWER SUPPLY

[75] Inventors: Klaus Reh, Albershausen; Gerhard Ruf, Stuttgart, both of Germany

[73] Assignee: International Standard Electric Corporation, New York, N.Y.

[22] Filed: Oct. 3, 1975

[21] Appl. No.: 619,420

[30] Foreign Application Priority Data

Oct. 19, 1974 Germany .......................... 2449476

[52] U.S. Cl. ................................. 315/411; 315/408
[51] Int. Cl.² .................... H01J 29/70; H01J 29/76
[58] Field of Search .......... 315/399, 408, 411, 410, 315/409

[56] References Cited

UNITED STATES PATENTS 3,796,827    3/1974    Riechmann .................... 315/408

*Primary Examiner*—Malcolm F. Hubler
*Assistant Examiner*—David Leland
*Attorney, Agent, or Firm*—John T. O'Halloran; Peter C. Van Der Sluys

[57] ABSTRACT

This TV receiver power supply is of the type wherein power to operate the audio output stage is taken from the horizontal output deflection circuit. To prevent interaction on the high voltage supply when high audio output levels are reached, the invention provides a compensating circuit arrangement which prevents any lowering of the high voltage during high audio peaks. This prevents noticeable changes in the TV picture width during audio peaks.

4 Claims, 1 Drawing Figure

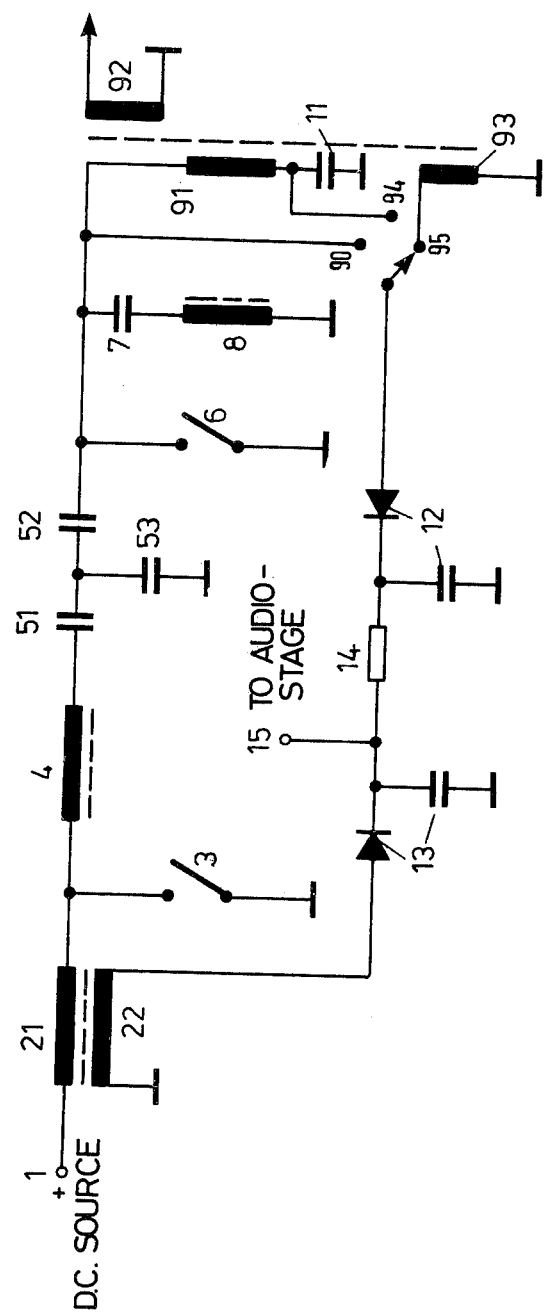

HORIZONTAL DEFLECTION CIRCUIT FOR TELEVISION RECEIVERS HAVING AN AUXILIARY POWER SUPPLY

BACKGROUND OF THE INVENTION

1. Field of the Invention

This invention relates to TV receiver power supplies of the type wherein power to operate the audio output stage is taken from the horizontal output deflection circuit.

2. Description of the Prior Art

The energy supplied to a horizontal deflection circuit must be controllable, and a suitable supply circuit consists, e.g., of a source of dc voltage and a storage inductance.

Horizontal sweep or deflection circuits are known in which, for generating a periodic sawtooth current within the respective deflecting coil of the picture tube, the deflection coil is connected in a first current branch, via a first controlled switch, conductive in both directions, to a sufficiently large dimensioned capacitor serving as the source of current, with the controlled switch being formed by the antiparallel connection of a controlled rectifier with a diode. The control electrode of the rectifier is connected to a source of control pulses by which the switch is rendered conductive during one part of the sawtooth sweep. The controlled rectifier is disconnected by a commutating process, i.e., by a current reversal in the controlled rectifier which is initiated by a second controlled switch.

Moreover, the first controlled switch forms part of a second current branch which, in a series arrangement with the controlled switch, contains a second source of current and a reactance capable of oscillating. The reactance substantially consisting of a coil and of a capacitor, serves to take up energy from the second source of current during a predetermined time interval when the first switch is closed. This energy as taken from the second source of current, corresponds to the switching losses which have incurred during the preceding deflection period.

In the known basic circuit as described hereinbefore, however, it has not been taken into consideration that it is customary to connect to the horizontal final stage also the high-tension transformer necessary for operating the picture tube. With the aid of this conventional circuit, the high-tension necessary for operating the picture tube, is generated in such a way that the horizontal flyback pulses are stepped up to the necessary voltage value by a step-up transformer, with the voltage being supplied to the picture tube via a rectifier arrangement. The high-tension transformer is arranged in parallel with the deflection system. Considering that the energy as taken off the high-tension transformer, in dependence upon the beam current variations, is not constant, the high tension must be correspondingly readjusted owing to the finite resistance of the high-tension source. This means to imply that the energy as supplied to the horizontal final stage must be equal to the already mentioned losses of the deflection circuit itself plus the energy required for operating the tube.

It is also known to obtain the energy required for supplying the audio output stage via a secondary winding of the storage inductance, likewise from the horizontal deflection circuit.

For avoiding, i.e., for stablizing the reactions caused by the changed loading by the audio output stage, upon the picture width of the television receiver, a special stabilization is required in this conventional type of circuit in the supply system for the audio output stage.

This stabilization involves a certain investment in circuitry and, moreover, causes additional power losses.

SUMMARY OF THE INVENTION

It is the object of the invention to provide a circuit which is improved with respect to the aforementioned drawbacks.

Within the scope of the horizontal deflection circuit described hereinbefore this object is achieved in that the audio output stage, via a further rectifying circuit, is connected to the stage of the horizontal deflection circuit controlling the line sweep, or to a part arranged subsequently thereto, and is additionally supplied.

This solution is based on the recognition that a certain load as connected to different points of the horizontal deflection circuit, has different and partly opposite effects upon the picture width.

Accordingly, when the power consumption for the audio output stage operated without a special stabilization, an increased power consumption in the conventional circuit had the effect of causing an increased picture width. If the same power were to be consumed, e.g., via a further winding of the high-tension transformer or taken off the combined deflection and high-tension transformer, this power consumption would at this point have the effect of causing a reduction of the picture width.

Hence, the invention makes use of this recognition to the effect that by a correspondingly distributed power consumption, the reactions upon the picture width annul each other.

According to a preferred embodiment of the invention, it is proposed that the further rectifier circuit is connected to the input of the audio output stage across a resistor. For this measure there is considered the fact that the reaction of the power consumption from the stage controlling the line sweep, or a part arranged subsequently thereto, upon the picture width does not become noticeable to exactly the same extent as the known power consumption from the storage inductance.

Further advantages of the invention, as well as details of the circuit may be taken from the following specification as well as from the shown example of embodiment.

BRIEF DESCRIPTION OF THE DRAWINGS

FIG. 1 shows the basic circuit diagram relating to a horizontal deflection circuit in which only those details are shown which are necessary for enabling a better understanding of the invention.

DESCRIPTION OF THE PREFERRED EMBODIMENT

Via the terminal 1, the horizontal deflection circuit is connected to the supply circuit of the television set. The supply current flows across the storage inductance 21 into the deflection circuit. The voltage applied to the terminal 1 is a dc voltage which is either already stabilized in a correspondingly designed supply circuit, with respect to any occurring mains voltage variations, or else by stabilizing circuit means contained in the horizontal deflection circuit itself. Such arrangements, for example, are already known for the assignee's U.S.

Pat. No. 3,895,256 and allowed application Ser. No. 401,519 filed Sept. 27, 1973. To the storage inductance 21 there are connected the commutating switch 3, the commutating inductance 4 and the commutating capacitor 51. These circuit elements constitute the so-called commutating stage of the horizontal deflection circuit.

The capacitors 52 and 53, as well as the line sweep switch 6 substantially form the stage of the horizontal deflection circuit controlling the line sweep.

This stage controlling the line sweep, as may be taken from FIG. 1 is followed by the deflection stage substantially consisting of the capacitor 7 and of the deflecting coil 8, as well as by the high-tension transformer comprising the various winding 91, 92 and 93. The complete mode of operation of this horizontal deflection circuit will not be described in detail herein, as not being necessary for understanding the invention, and because of being described in detail, on the other hand, in the known Prior Art publications.

The storage inductance 21 carries a secondary winding 22 via which, as is well known, energy is transformer-coupled out for supplying the audio output stage. The voltage applied to the secondary winding 22 is an ac voltage with the frequency thereof corresponding to the line frequency. The ac voltage is applied to the input terminal 15 of the audio output stage via a first rectifier arrangement 13 which, in this case, consists of a rectifier and of a capacitor and acts as a point contact diode rectifier. The energy required for the audio output stage, is not constant but varies in dependence upon the volume of the sound information to be reproduced. Owing to the finite internal resistance of the supply source including the storage inductance 21 and 22, load variations at the secondary coil 22 also have effects on the horizontal deflection circuit, i.e. in such a way that the picture width of the television picture varies in the rhythm of the sound volume variations. As already indicated hereinbefore, an increased power consumption at the secondary winding 22 has the effect of increasing the picture width. In conventional circuits, for avoiding this disturbance, stabilizing circuit means are inserted in the circuit connected to the secondary winding, with these means acting in such a way that the loading will always become equally high, i.e. substantially as high as required by the sound volume to be expected, otherwise the consumed energy is converted as a power loss into heat.

In cases where the energy consumption at the winding 22 or in the subsequently following commutating stage (3, 4, 51) causes an enlargement of the picture width, the same energy consumption in the stage controlling the line sweep, in this case, e.g. at the terminal 90, or in a subsequently arranged stage, such as at the terminals 94 or 95 of the high-tension transformer, is noticed as a reduction of the picture width. By making use of these effects, the invention proposes that a second rectifier arrangement 12 designed in analogy to the one (13) already described, is connected to the terminal 15. Via this rectifier arrangement 12 energy is now taken from the horizontal deflection circuit also at one of the terminals 90, 94 or 95, for being supplied to the audio output stage. It is left to the person skilled in the art to decide at what point the energy is to be taken off, e.g. either at one of the terminals 90, 94 or 95 as shown by way of example, or elsewhere. As shown, a resistor 14 is inserted into the connection between the second rectifier arrangement 12 and the terminal 15. By correspondingly selecting the resistance value of the resistor 14, it is achieved in a simple way that the extent of the picture width variation which is dependent upon the point of energy consumption, is exactly adjusted in such a way that the two opposite influences will just compensate each other, thus causing the picture width to remain unaffected in the end, as intended.

As may be taken from the aforementioned patents, and as not shown herein, the line-frequency alternating current in the horizontal deflection circuit and, consequently, the induced ac voltage at the secondary winding has an asymmetrical shape, i.e. both halfwaves of the ac voltage have different shapes of curves. Moreover, if the regulation of the energy required in the horizontal deflection circuit, is effected by circuit elements in the deflection circuit itself, as is the case in the previously mentioned patents of the Assignee, then, for example, during a control operation, the amplitude is changed in the one halfwave of the ac voltage as applied to the secondary winding, and in the opposite polarity halfwave there is changed the width, with the amplitude remaining constant within a certain control range. When choosing the polarity of the point contact diode rectifiers in the arrangements 12 and 13 in such a way as to be rendered conductive during the halfwave having the constant amplitude, this will offer the considerable advantage that a constant dc voltage will be obtainable at the terminal 15.

What is claimed is:

1. A horizontal deflection circuit of the type that provides an auxiliary power supply, comprising:
   a storage inductance adapted to be connected to a power source;
   control means connected to the storage inductance and energized thereby and having means for controlling line sweep and means for controlling commutation;
   a deflection unit connected to and controlled by the control means;
   a secondary winding coupled to the storage inductance;
   a first rectifier circuit connected to the secondary winding and energized thereby;
   a second rectifier circuit connected to the means for controlling line sweep and energized thereby; and
   means connected to the first and second rectifier circuits and energized thereby for providing the auxiliary power supply, whereby variations in a load applied to the auxiliary power supply will have negligible effect on the horizontal deflection since increased load on the secondary winding has a tendency to increase horizontal deflection while increased load on the means for controlling line sweep has a tendency to reduce horizontal deflection thereby cancelling the effect of load changes on the horizontal deflection.

2. A horizontal deflection circuit as described in claim 1, additionally comprising a resistor disposed between the second rectifier circuit and the means for providing the auxiliary power supply.

3. A horizontal deflection circuit as described in claim 1, additionally comprising a high voltage transformer connected to said means for controlling line sweep, said second rectifier circuit being connected to the means for controlling line sweep through the high voltage transformer.

4. A horizontal deflection circuit as described in claim 3, additionally comprising a resistor disposed between the second rectifier circuit and the means for providing the auxiliary power supply.

* * * * *